March 19, 1968

L. B. FURRY 3,373,719

HOT MELT GLUE APPLICATOR

Filed March 26, 1965

LYMAN B. FURRY
INVENTOR.

BY

HIS ATTORNEY

March 19, 1968  L. B. FURRY  3,373,719
HOT MELT GLUE APPLICATOR

Filed March 26, 1965  3 Sheets-Sheet 2

LYMAN B. FURRY
INVENTOR.

BY

HIS ATTORNEY

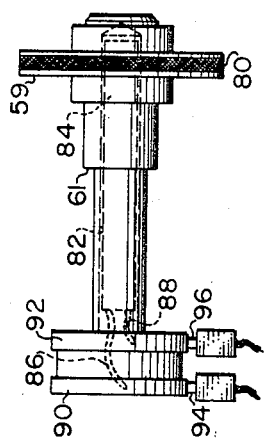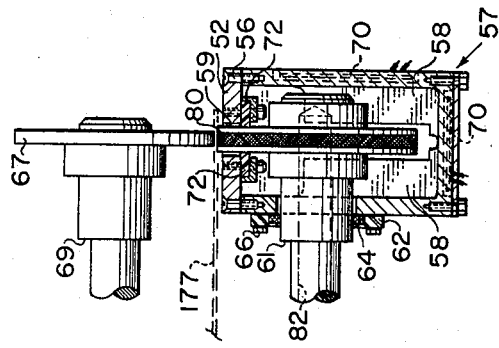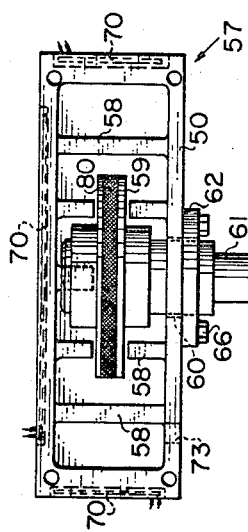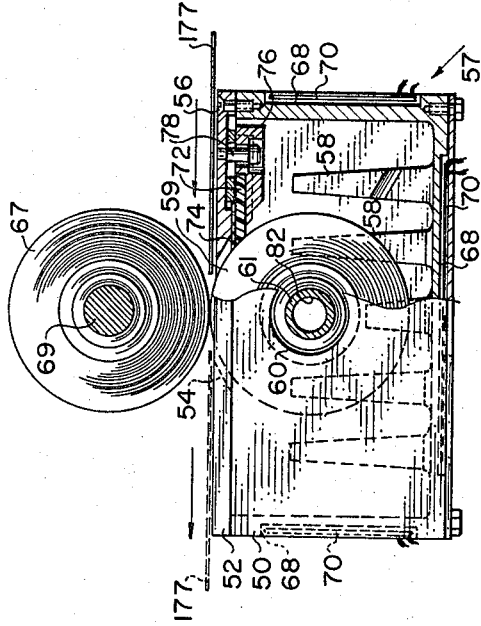

United States Patent Office 3,373,719
Patented Mar. 19, 1968

3,373,719
HOT MELT GLUE APPLICATOR
Lyman B. Furry, Danville, Ill., assignor to Montgomery Machine Service Inc., Danville, Ill., a corporation of Illinois
Filed Mar. 26, 1965, Ser. No. 442,948
2 Claims. (Cl. 118—202)

ABSTRACT OF THE DISCLOSURE

An improved hot melt glue applying apparatus capable of high speed operation without waste comprises one or more heated reservoirs for a hot melt glue and electrically heated knurled glue applicator wheels (with recessed knurling) rotating within the reservoirs. The reservoirs and glue applying wheels are both heated to maintain the glue in a fluid condition up to the point of application to the box or carton being processed. The reservoirs are provided with a suitable arrangement of baffles and ribs to prevent the molten glue from splashing out during high speed operation. The apparatus preferably includes a storage hopper for cartons or boxes being processed and continuous feed belts or other feed means for high speed movement of boxes or cartons through the apparatus. The hopper, feed mechanism, and glue applying means are adjustable to handle boxes or cartons of varying size.

---

Figure 1:
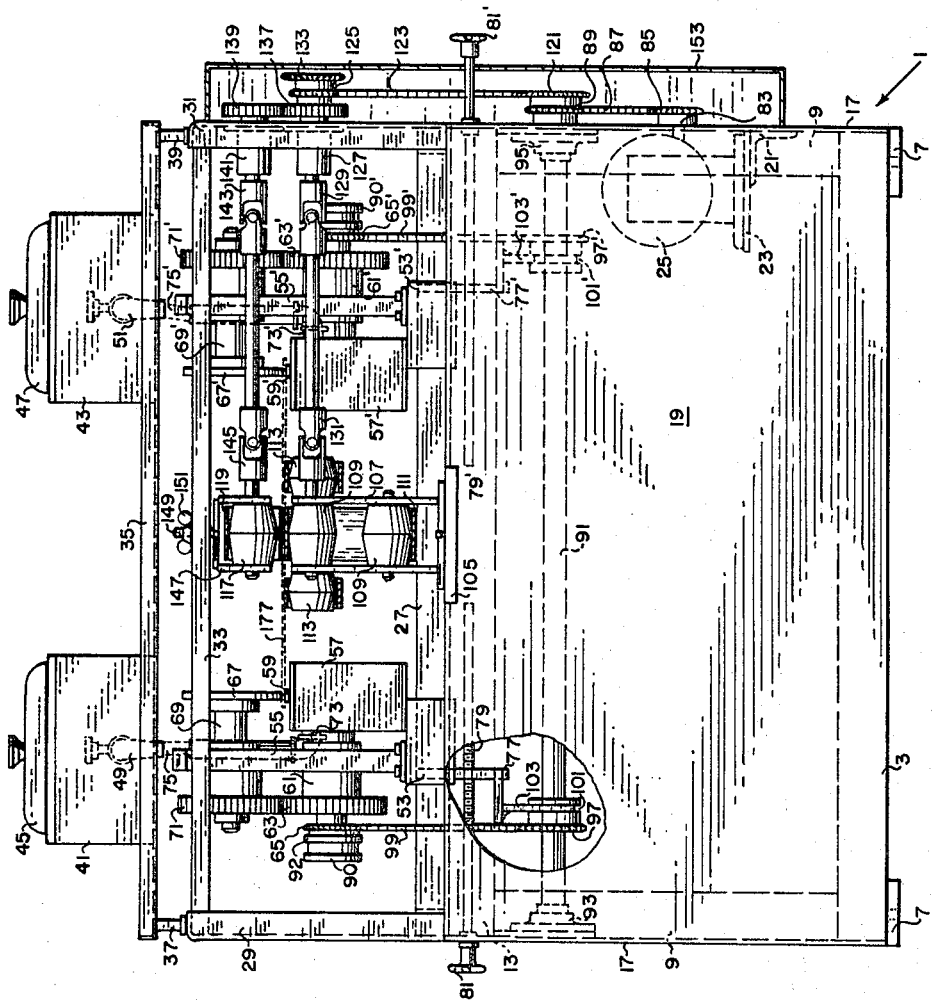

This invention relates to new and useful improvements in apparatus for applying hot melt coatings and more particularly to an improved apparatus for high speed application of hot melt glues to boxes or cartons in preparation for sealing.

In recent years extensive use has been made of hot melt glues in the sealing of boxes and cartons. These glues are thermoplastic compositions which are pre-applied to boxes or cartons and then activated by heating after the box or carton has been filled. The used of hot melt glues in the sealing of boxes and cartons has permitted the high speed packaging of food products, particularly sliced bacon, with a minimum loss of time in handling. In the packaging of sliced bacon, thin open-ended cartons are used which are closed by end flaps and sealed by application of heat to the flap against a line of hot melt glue which has been pre-applied to the carton. The popularity of this type of packaging has created a considerable demand for an apparatus for high-speed application of hot melt glues to cartons.

In designing and maufacturing machines for high speed application of hot melt glues to cartons several serious problems have arisen which have not been solved in glueing machines which are available commercially. Commercially available glueing machines are not provided with any means to maintain the glue in a sufficiently fluid condition to permit high speed application to cartons or boxes. Machines which are available commercially do not have features of adjustability to handle a variety of box or carton sizes. Also, commercially available machines do not have designed features which permit high speed application of hot melt glues to predetermined localized areas on the cartons or boxes being processed.

It is therefore one object of this invention to provide a new and improved apparatus for application of hot melt glues to cartons or boxes at high speed.

Another object of this invention is to provide an improved apparatus for application of hot melt glues to cartons or boxes of varying sizes.

Still another object of this invention is to provide a new and improved apparatus for applying hot melt glues at high speed to cartons or boxes at predetermined localized areas.

Still another object of this invention is to provide a new and improved apparatus for high speed application of hot melt glues in which the glue is continuously maintained in a fluid condition up to the point of application to the carton or box being processed.

Still another object of this invention is to provide a new and improved apparatus for high speed application of hot melt glues in which the glue applicator can be operated at a high speed without waste of glue.

A feature of this invention is the provision of a new and improved apparatus for high speed application of hot melt glues to boxes or cartons including glue applicator means which are relatively adjustable for processing boxes or cartons of varying size.

Another feature of this invention is the provision of a new and improved apparatus for high speed application of hot melt glues including means to maintain the glue in a fluid condition up to the point of application to the carton or box being processed.

Still another feature of this invention is the provision of a new and improved apparatus for high speed application of hot melt glues including a glue applicator wheel having a configuration for effecting application of glue in predetermined localized areas on a box or carton being processed.

Still another feature of this invention is the provision of a new and improved apparatus for high speed application of hot melt glues to boxes or cartons and including a system of glue applicator wheels provided with improved means for preventing waste of glue at high speed operation.

Other objects and features of this invention will become apparent from time to time throughout the specification and claims as hereinafter related.

SUMMARY OF THE INVENTION

This invention comprises an improved hot melt glue applying apparatus. The apparatus is a machine capable of very high speed operation without waste in the application of hot melt glues to boxes or cartons. In this machine there are provided one or more heated reservoirs for the hot melt glue to be applied and having electrically heated knurled glue applicator wheels (with recessed knurling) rotating within the reservoirs. In this apparatus both the reservoirs and the glue applying wheels are heated to maintain the glue in a fluid condition both in the reservoir and on the wheel at the point of application to the box or carton being processed.

The reservoirs are provided with a suitable arrangement of baffles and ribs to prevent the molten glue from splashing out during high speed operation. The apparatus includes a storage hopper for cartons or boxes being processed and continuous feeding means, such as feed belts, for high speed movement of boxes or cartons through the apparatus. The hopper, feed mechanism, and glue applying means are adjustable to handle boxes or cartons of different sizes.

Figure 3:
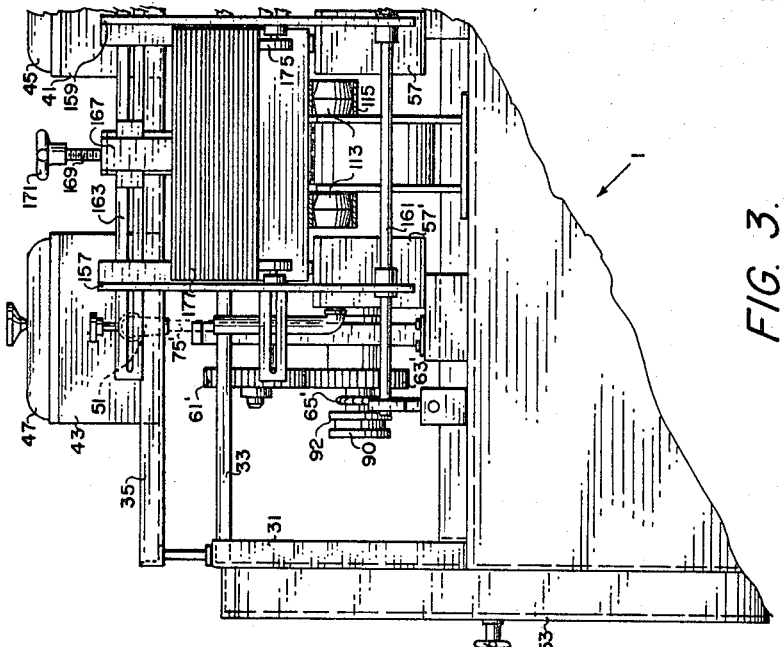
Figure 2:
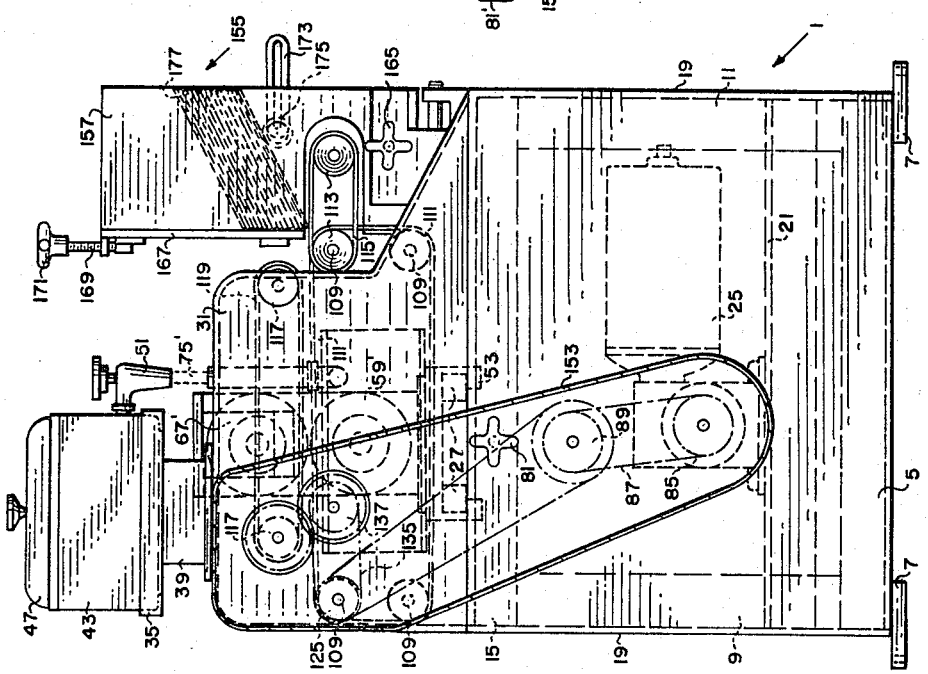

In the accompanying drawings, to be taken as a part of this specification, there is clearly and fully illustrated a preferred embodiment of this invention, in which drawings, FIG. 1 is a view in front elevation of the high speed glue applying apparatus of this invention with portions of the apparatus shown in section, FIG. 2 is a view in side elevation of the apparatus shown in FIG. 1, FIG. 3 is a fragmentary rear elevation view of the apparatus shown in FIGS. 1 and 2 and showing the adjustable feed hooper arrangement, FIG. 4 is a detail view partially in elevation and partially in section of the arrangement of glue applying wheels and molten glue reservoir, FIG. 5 is a top plan view of the reservoir and feed wheel arrangement shown in FIG. 4 with the upper wheel and cover removed, FIG. 6 is a view in right elevation, partially in section, of the feed wheel and glue reservoir arrangement shown in FIG. 4, and FIG. 7 is a detailed view of the knurled glue applying wheel which is positioned in the glue reservoirs, as shown in FIGS. 4 to 6, and showing the electrical connections to the heater in the wheel.

Referring to the drawings by numerals of reference and more particularly to FIGS. 1 to 3 there are shown front, side and rear views of a novel apparatus 1 for high speed application of hot melt glues to boxes or cartons. Apparatus 1 has a welded angle iron framework and is covered with heavy gauge sheet metal panels. The lower portion of the framework for apparatus 1 includes a pair of angle irons 3 extending longitudinally of the apparatus as shown in FIG. 1 at the front and back edges of the base. Angle irons 3 are connected at their ends by laterally extending angle irons 5 as shown in FIG. 2. The base angle irons 3 and 5 are secured together to form a rectangular framework by welding and are welded to rectangular plates 7 at each corner of the base. From each corner of the base, angle irons 9 at the front and 11 at the back extend vertically and have their upper ends welded to longitudinally extending angle irons 13 at front and back and to laterally extending angle irons 15 at each side. The arrangement of angle irons 3, 5, 9, 11, 13 and 15 forms a rectangular framework comprising the base of the apparatus.

The base of the apparatus is covered with sheet metal walls 17 on the ends and sheet metal walls 19 on the front and back. These sheet metal walls may either be bolted or welded to the framework. It is preferred that at least one wall be bolted to the framework to provide access to the apparatus for repair and maintenance. The lower framework is provided with angle iron support 21 extending from front to back in FIG. 1 on which there is positioned plate 23 supporting electric motor 25 for driving the apparatus. The electric motor 25 is connected through a sprocket gear drive mechanism which will be subsequently described for operating the various separate portions of the apparatus.

At the upper portion of the base framework there are provided a pair of steel rails 27 of square cross section. Rails 27 extend across the entire length of the apparatus as shown in FIG. 1 and provide supports for the conveyor and glue applying portions of the apparatus. End plates 29 and 31 are secured to the supporting base of the apparatus adjacent to the ends of rails 27 and are spaced and supported at the top by a square rod 33. End plates 29 and 31 are of a very heavy gauge sheet metal and are sufficiently strong to support part of the sprocket and chain gear mechanism for transmission of power. At the top of the apparatus there is provided tray 35 which is secured at 37 and 39 to the upper end portion of end plates 29 and 31 respectively. The tray 35 provides an adjustable support for pots or reservoirs 41 and 43 for the hot melt adhesive or glue used in the apparatus. Glue pots 41 and 43 are provided with removable covers 45 and 47 respectively and outlet valves 49 and 51.

In the upper portion of the apparatus at opposite ends thereof, as viewed in FIG. 1, there are provided a pair of identical rotary glue applying devices and drive mechanisms therefor. Since these portions of the apparatus are identical the various parts thereof will be described for only one of the glue applying devices and the same part numbers with a prime added thereto will be used for identifying the other glue applying device. There are provided a pair of support plates 53 and 53' which are slidably supported on rails 27, as shown in FIGS. 1 and 2.

Support plates 53 and 53' have vertically extending plates 55 and 55' secured thereon. On plates 53 and 53' there are also supported glue or adhesive reservoirs 57 and 57' are each provided with glue applying wheels 59 and 59' which are shown and described in more detail in FIGS. 4 to 7. Applicator wheels 59 and 59' are provided with shafts 61 and 61' respectively. Shafts 61 and 61' are in turn provided with gear wheels 63 and 63' and sprockets 65 and 65'. At the extreme outer end of shafts 61 and 61' there are provided a set of electrical collector rings which will be shown and described in FIG. 7.

Positioned above the applicator wheels 59 and 59' are a pair of pressure wheels 67 and 67'. These pressure wheels are provided with shafts 69 and 69' journaled in support plates 55 and 55' respectively. At the end of shafts 69 and 69' opposite guide wheels 67 and 67' there are provided gears 71 and 71' positioned in operative engagement with gear wheels 63 and 63' respectively.

Reservoirs 57 and 57' are provided with inlet openings 73 and 73' which are connected by conduits 75 and 75' to outlet valves 49 and 51 respectively on adhesive reservoirs 41 and 43. The entire arrangement of adhesive reservoirs, gears, glue applying wheels, and guide wheels is shiftable along support rails 27. The adhesive reservoirs 41 and 43 at the top of the apparatus are shiftable along support plate 35.

Support plates 53 and 53' for the glue applying portion of the apparatus are each provided with downwardly extending platelike projections 77 and 77' through which extend adjusting screws 79 and 79' to move support plates 53 and 53' and the apparatus supported thereon longitudinally of the support rails 27.

The glue applying portions of the apparatus, just described, are operated by electric motor 25. Motor 25 is provided with shaft 83 having sprocket 85 connected by chain 87 to drive sprocket 89. Drive sprocket 89 is positioned on one end of drive shaft 91 which is supported at its ends at points 93 and 95 on the lower supporting framework. Shaft 91 is supported at 93 and 95 for rotation. On shaft 91 there are positioned a pair of sprocket wheels 97 and 97' having chain drive belts 99 and 99' connected to sprockets 65 and 65' respectively. Sprockets 97 and 97' fit slidably on shaft 91 and may be slid longitudinally of the shaft and are keyed to a driving relation thereto. Sprockets 97 and 97' have peripheral grooves 101 and 101' into which fit fingers 103 and 103' extending downwardly from adjustment plate members 77 and 77'. Thus, as handles 81 and 81' are rotated to move support plates 53 and 53' along support rails 27 the drive sprockets 97 and 97' are moved to the same extent to retain the sprockets 97 and 97' in driving alignment with sprockets 65 and 65'.

The apparatus is provided with a system of upper and lower feed belts positioned between the movable glue applying portions of the apparatus. There is provided a supporting base 105 and frame 107 provided with a system of pulleys 109 for driving lower feed belt 111. It should be noted that the upper pulleys 109 are located behind other wheels and are therefore indicated by dotted lead lines. At the rear of the apparatus there are provided a pair of pulleys wheels 113 for feed belt 115. One of the pulley wheels 113 is mounted on the same shaft as one of the pulley wheels 109 and is therefore driven by the same drive mechanism. Positioned above drive belt 111 are a pair of drive wheels 117 which operate drive belt 119. It should be noted that drive belts 111, 115 and 119 all operate at the same linear speed.

The system of feed belts is driven by electric motor 25 through a sprocket and chain gear drive mechanism. Shaft 91 is provided with sprocket 121 and chain belt drive 123 connected to sprocket 125 on drive shaft 127. Drive shaft 127 is provided with flexible connectors 129 and 131 for driving one of the drive wheels 109. Shaft 127 is also provided with a sprocket 133 and chain 135 connected to sprocket gear 137. Gear 137 in turn meshes with gear 139 which is positioned on shaft 141. Shaft 141 has flexible connectors 143 and 145 connecting it to drive roller 117 for the upper drive belt 119.

Roller 117 is supported in frame 147 which is supported on rods 33 by bolts 149 and adjustment screws 151. This arrangement permits vertical adjustment of upper drive belt 119 to accommodate boxes of different thickness in the apparatus. The sprocket and gear transmission from the motor 25 to the drive belt system is provided with a cover plate 153 shown in FIGS. 1 and 2.

In FIG. 3 and in the upper right hand portion of FIG. 2 there is shown an adjustable supply hopper for feeding boxes to be processed in this machine. The adjustable hopper is generally designated 155 and includes a pair of vertically extending side walls 157 and 159 supported at the bottom on rod 161 and at the top in slotted support member 163.

Hopper 155 is provided with handle 165 which operates a threaded adjustment member which is not shown but is positioned behind rod 161 as seen in FIG. 3. Hopper 155 also includes vertically extending bar 167 which is supported on slotted support member 163 and provided with threaded adjustment member 169 and handle 171 for vertical adjustment. Member 167 is adjustable vertically to provide a small variation in clearance adjacent to feed belt 115 to facilitate the handling of boxes or cartons of varying thickness.

Hopper 155 is also provided with a pair of slotted members 173 having cylindrical guide members at their inner ends and adjustable to position the boxes or cartons being processed at the proper angle for pick up and feed by the system of feed belts. A number of boxes or cartons being processed in the apparatus are shown in dotted lines as 177 in FIG. 2 and in full line in FIG. 3. Cartons 177 are also shown in FIG. 1 in position between the feed belts and the glue applying wheels. The relationship of the cartons 177 as fed through the apparatus is also illustrated in FIGS. 4 and 6.

In FIGS. 4 to 7 there are shown more of the details of the glue applying apparatus. In these figures the description and the numbering of parts will be with respect to glue reservoir 57 and the parts associated thereiwth. Since glue reservoir 57' and the parts associated therewith are identical there is no repetition of description for that portion of the apparatus. In FIG. 4 the glue reservoir 57 is shown as comprising a rectangular pot portion 50 having a lid 52 with a slot 54 through which the upper portion of applicator wheel 59 extends. Lid 52 is secured on glue pot 50 by a plurality of bolts 56. Glue pot 50 is provided with a plurality of ribs 58 extending across the open reservoir hand having a portion cut out to receive applicator wheel 59. Glue pot 50 is also provided with a side aperture 60 through which shaft 61 extends. A metal sealing ring 62 and plastic gasket 64 are secured to the side of glue pot 50 by a plurality of bolts 66. Ring 62 and gasket 64 seal opening 60 against leakage of molten glue from the glue pot.

Glue pot 50 is provided with a plurality of recesses 68 in which there are positioned electric heaters 70 for heating the walls of the pot to maintain the glue or hot melt adhesive in a fluid condition.

Cover 52 has a plastic gasket 72 preferably of a heat resistant thermoplastic such as polytetrafluoroethylene (Teflon) positioned to engage the surface and sides of applicator wheel 59. Gasket 72 is pressed against the surface of wheel 59 by metal spring 74 (which also dresses the wheel for an accurate coating of glue). Spring 74 and gasket 72 are secured in place by clamping bracket 76 and screws 78.

Applicator wheel 59 has a coarsely knurled surface 80, recessed about 0.001–0.003 in., which facilitates application of the hot melt adhesive in a pattern of small dots corresponding to the space between the knurls. Shaft 61 for applicator wheel 59 is hollow as indicated at 82 and has a thermostatically controlled heater 84 positioned therein to maintain the wheel at a temperature such that the hot melt adhesive will be maintained fluid up to the point of contact with the boxes or cartons being processed. Heater 84 is connected by lead wires 86 and 88 to collector rings 90 and 92 which are engaged by electrical brushes 94 and 96 for connection to a source of electric power (not shown).

The adhesive reservoirs 41 and 43 are heated by electric heaters (not shown) substantially the same as heaters 70. The glue pots 57 and 57' are heated by electric heaters 70 as shown in FIGS. 4 to 6. Applicator wheel 59 is heated by electric heater 84 as previously described. This arrangement of heaters causes the hot melt adhesive to be maintained fluid at all points in the apparatus up to the point of application to the boxes or cartons being processed. The system of ribs 58 and gaskets 72 permits high speed operation of the applicator wheel 59 without waste of glue or adhesive. In fact, these applicator wheels have been operated at extremely high speeds with no splashing of the molten adhesive or loss of adhesive by centrifugal force from the applicator wheel. During operation of this apparatus when a box or carton is fed between applicator wheel 59 and the upper feed wheel 67 glue or adhesive is applied to the box or carton in the form of a pattern of small dots. Only at points where the box or carton is held firmly against wheel 59 by pressure 67. If an interrupted pattern of adhesive is desired on the carton or box being treated, wheel 67 can be provided with spaced cut-out portions where no pressure is applied to press the carton or box against applicator wheel 59.

OPERATION

The operation of this apparatus is obvious from the description of the assembly and function of the constituent parts. Nevertheless, a summary of the operation may assist in a more thorough understanding of the invention.

When the apparatus is to be operated, hopper 155 is adjusted to the size of the boxes or cartons being processed. The rear vertical member 167 of hopper 155 is adjusted vertically by handle 171 and screw 169 to permit the feeding of boxes or cartons one at a time. The electric heaters are energized to maintain reservoirs 41 and 43, glue pots 57 and 57' and applicator wheels 59 and 59' at a temperature above the melting point of the hot melt adhesive. It should be noted that the electric circuits and switches for the heaters and for controlling the electric motor (not shown) are simple rheostatic switches. The adhesive which is used with this apparatus may be any hot melt adhesive of the thermoplastic type. A preferred adhesive which has been used in commercial operation of this apparatus is Union Paste #H90 hot melt adhesive manufactured by Union Paste Co.

Handles 81 and 81' are actuated to cause screws 79 and 79' to adjust the position of the glue applicator portions of the apparatus to the desired location in relation to the box or carton being processed. When the motor is energized, feed belts 111, 115 and 119 are rotated to feed the boxes or cartons through the apparatus for application of adhesive along one or more lines at the ends of the boxes. Feed belt 115 picks up the box or carton at the bottom of the stack in hopper 155 and in cooperation with feed belts 111 and 119 feeds the box or carton 177 by belts 113, 111 and 119 as shown by close examination of FIGS. 1 and 2 of the drawings.

In FIG. 1, the feed belts are shown moving box or carton 177 into position between applicator wheels 59 and 59' and feed wheels 67 and 67'. In FIG. 4, the full line and dotted line views of box or carton 177 show the introduction of the box or carton between wheels 59 and 67 and the ejection of the box or carton beyond the wheel.

While the apparatus is complete, as shown, it may prove desirable to have a moving belt or other suitable conveyor positioned at the ejection side of the apparatus to receive the boxes or cartons which have been partially coated with adhesive for conveying them to a point of storage or further processing. The several novel features which have been combined in this glue applying apparatus have resulted in the production of a high speed machine which has handled boxes or cartons at speeds up to 60,000 per hour.

While this invention has been described fully and completely with special emphasis upon a preferred embodiment thereof it should be understood that within the scope of the appended claims the invention may be practiced otherwise that as specifically described herein.

What is claimed is:

1. An apparatus for applying hot melt adhesives to a flat material fed therethrough which comprises, a reservoir for said adhesive, heating means for said reservoir, an applicator wheel positioned in said reservoir and rotatable to apply adhesive to a flat material passed in contact therewith, a press wheel positioned over said applicator wheel and rotatable in conjunction with said applicator wheel to feed said flat material and press the same against said applicator wheel for application of said adhesive only at the point of pressure, heating means for said applicator wheel to maintain the adhesive fluid up to the point of application to said flat material, said reservoir having a plurality of internal ribs between which said applicator wheel rotates, said reservoir having a slotted cover through which said applicator wheel extends, and temperatures resistant plastic gaskets in said reservoir fitting against said applicator wheel, said gasket and said ribs preventing loss of adhesive during high speed rotation of said applicator wheel.

2. An apparatus as defined in claim 1 in which said applicator wheel has a recessed knurled peripheral surface and said first and second named heating means are electrically energized heaters.

References Cited

UNITED STATES PATENTS

| | | | |
|---|---|---|---|
| 1,127,538 | 2/1915 | Staude | 118—249 |
| 2,079,563 | 5/1937 | Reuter | 118—261 X |
| 2,659,340 | 11/1953 | Zinn | 118—202 |
| 2,877,737 | 3/1959 | Taggart | 118—236 X |
| 3,030,916 | 4/1962 | Brown et al. | 118—261 X |
| 3,313,270 | 4/1967 | LaBombarde et al. | 118—202 |

CHARLES A. WILLMUTH, *Primary Examiner.*

L. G. MACHLIN, *Assistant Examiner.*